United States Patent
Koo (10) Patent No.: US 7,058,124 B2
(45) Date of Patent: Jun. 6, 2006

(54) REVERSE DATA TRANSMISSION METHOD AND APPARATUS IN MOBILE COMMUNICATION SYSTEM

(75) Inventor: Chang-Hoi Koo, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 831 days.

(21) Appl. No.: 09/894,601

(22) Filed: Jun. 28, 2001

(65) Prior Publication Data

US 2002/0136286 A1    Sep. 26, 2002

(30) Foreign Application Priority Data

Jun. 28, 2000   (KR) ............................. 2000-36228
Jun. 30, 2000   (KR) ............................. 2000-38096

(51) Int. Cl.
    *H04B 17/00*    (2006.01)
(52) U.S. Cl. ...................... 375/225; 375/377; 370/252; 455/252.1; 455/450; 455/88
(58) Field of Classification Search ................ 375/225, 375/325, 375; 370/252, 230, 231; 455/452, 455/452.1, 450, 88
    See application file for complete search history.

(56) References Cited

U.S. PATENT DOCUMENTS

| 6,741,862 B1* | 5/2004 | Chung et al. ............ 455/452.1 |
| 2002/0181410 A1* | 12/2002 | Bae et al. |
| 2003/0125037 A1* | 7/2003 | Bae et al. |
| 2004/0146016 A1* | 7/2004 | Kim et al. |

* cited by examiner

*Primary Examiner*—Stephen Chin
*Assistant Examiner*—Eva Zheng
(74) *Attorney, Agent, or Firm*—Dilworth & Barrese LLP (57) ABSTRACT

A reverse data rate controlling method in a mobile communication system for transmission of packet data is provided. In an embodiment of the present invention, an RRL (Reverse Rate Limit) message includes an ignore RAB (Reverse Activity Bit) field to ensure a predetermined data rate for a particular access terminal (AT). In another embodiment of the present invention, an access probability is set for each data rate in the RRL message. Upon receipt of an RAB, an AT compares a random number with the access probability for its data rate and increases or decreases the data rate according to the comparison result.

27 Claims, 8 Drawing Sheets

REVERSE DATA TRANSMISSION METHOD AND APPARATUS IN MOBILE COMMUNICATION SYSTEM

BACKGROUND OF THE INVENTION

1. Field of the Invention

The present invention relates generally to a data transmission method in a mobile communication system, and in particular, to a reverse data transmission method in a mobile communication system.

2. Description of the Related Art

An high data rate mobile communication system is a CDMA (Code Division Multiple Access) system dedicated to transmission of packet data. For efficient packet transmission both on the forward link and on the reverse link, scheduling must be appropriately made.

On the forward link, an AN (Access Network) transmits data to a particular access terminal (AT) showing the most excellent channel state, taking the air state and other channel conditions into consideration, to thereby maximize the data transmission throughput of the AT. On the reverse link, on the other hand, a plurality of ATs access the AN simultaneously. Therefore, the AN controls the data flow from the ATs in order to prevent traffic congestion and controls overhead within its capacity.

Reverse data transmission is controlled by the use of an RAB (Reverse Activity Bit) and an RRL (ReverseRateLimit) message transmitted from an AN in the existing high data rate system. A forward MAC (Medium Access control) channel is transmitted to an AT in TDM (Time Division Multiplexing) along with a pilot channel, an FAB (Forward Activity Bit), and an RAB. The RAB represents the congestion of the reverse link, and a data rate available to the AT varies with the RAB. That is, the AN increases or decreases the data rate of the AT by means of the RAB when controlling overhead and capacity on the reverse link. However, since the RAB is broadcasted, all ATs receiving the RAB indiscriminately double their data rates or reduce them by half according to the RAB. The RAB occurs repeatedly during transmission as shown in Table 1 below. If RABlength is "00", that is, eight slots, the same RAB occurs repeatedly in eight slots. As the RAB is made longer, the period for which the same RAB lasts is increased, that is, the data rate of the reverse link is changed more slowly.

TABLE 1

| Binary | Length (slots) |
|---|---|
| 00 | 8 |
| 01 | 16 |
| 10 | 32 |
| 11 | 64 |

While the above reverse data rate control method utilizing RAB provides simply band management in the system aspect, it does not ensure a dynamic data rate for an AT and has a serious influence on the quality of data transmission.

For example, the characteristics of ATs like premium ATs and emergency ATs and data characteristics, such as high quality transmission and real time transmission, are not considered in determining a data rate.

Figure 1:
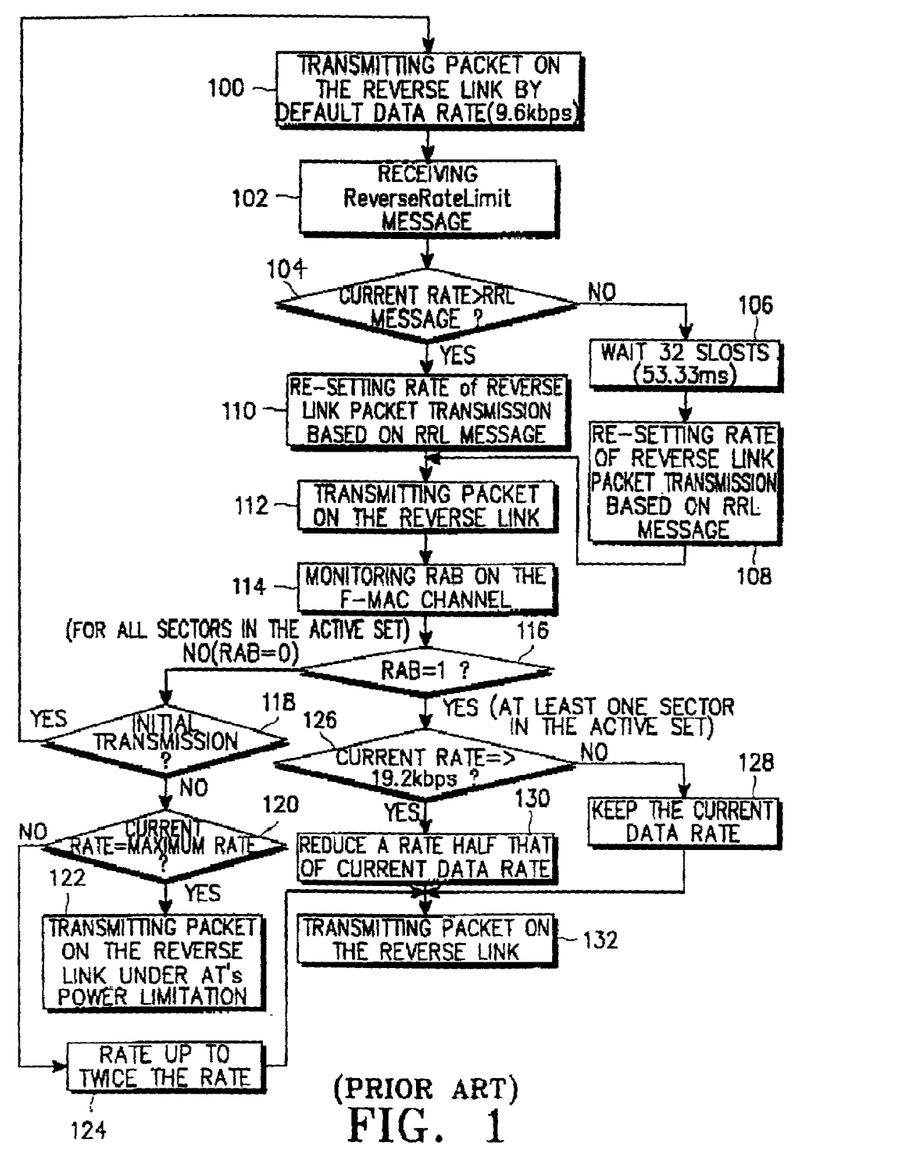
FIG. 1 is a flowchart illustrating a conventional reverse data rate determination procedure at an AT in an HDR system.

FIG. 1 is a flowchart illustrating a conventional reverse data ate determination operation at an AT in an HDR system.

In general, an AT notifies an AN of the current data rate on the reverse link by an RRI (Reverse Rate Indicator). The reverse data rate is one of 4.8, 9.6, 19.2, 38.4, 76.8, and 153.6 kbps.

At an initial access, the AT transmits packet data with a preamble at a default data rate of 9.6 kbps, in step 100. Upon receipt of an RRL message in step 102, the AT compares the current data rate with a data rate set in the RRL message in step 104. If the current data rate is lower than that of the RRL message, the AT waits 32 slots (53.3 ms) in step 106 and resets the reverse data rate based on the RRL message in step 108.

On the other hand, if the current data rate is higher than the data rate of the RRL message, the AT resets the reverse data rate based on the RRL message in step 110. To help the AT reset the reverse data rate, the AN transmits an RRL message shown in Table 2.

TABLE 2

| Field | Length (bits) |
|---|---|
| Message ID | 8 |
| 29 occurrences of the following two fields | |
| RateLimitIncluded | 1 |
| RateLimit | 0 or 4 |
| Reserved | Variable |

The RRL message can include up to 29 records, each record indicating a data rate assigned to a corresponding MACindex. MACindexes are numbered 3 through 32. Message ID is a field indicating the ID of the RRL message and RateLimitIncluded indicates whether a field RateLimit is included or not. If RateLimitIncluded is 0, RateLimit is omitted and, if RateLimitIncluded is 1, RateLimit is included. RateLimit indicates a data rate assigned to an AT. The AN can assign the following reverse data rates to ATs in 4 bits.

| | |
|---|---|
| 0 × 0 | 4.8 kbps |
| 0 × 1 | 9.6 kbps |
| 0 × 2 | 19.2 kbps |
| 0 × 3 | 38.4 kbps |
| 0 × 4 | 76.8 kbps |
| 0 × 5 | 153.6 kbps |
| All other values are invalid. | |

In step 112, the AT transmits packet data at a reset data rate. While transmitting the reverse data, the AT monitors forward MAC channels, especially RABs on the forward MAC channels transmitted from ANs in step 114.

Figure 2:
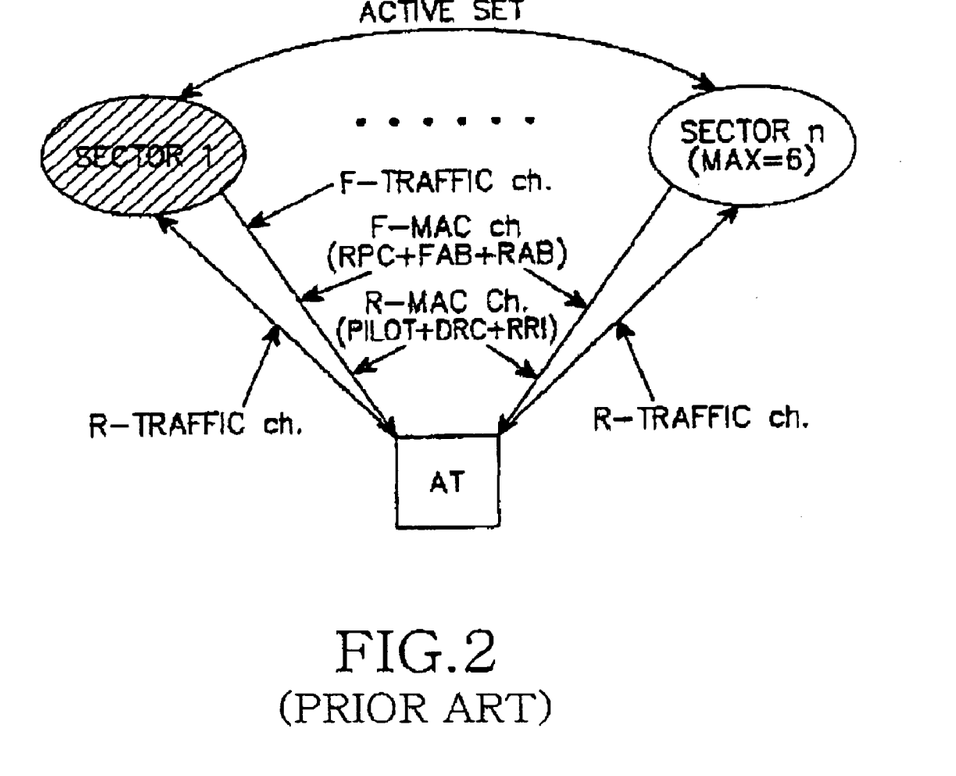
FIG. 2 illustrates operations and assigned channels between an AT and sectors in an active set in the HDR system.

FIG. 2 illustrates operations between HDR sectors in an active set and an AT. As shown in FIG. 2, a forward traffic channel, a reverse traffic channel, a forward MAC channel, and a reverse MAC channel are established between the AT and sector 1 connected to the AT. Meanwhile, no forward traffic channels are assigned between the AT and sectors 2 through 6 that are not connected to the AT. The AT can have up to 6 sectors in its active set and monitors RABs on forward MAC channels from all the sectors of the active set to determine a reverse data rate. Consequently, all ATs receiving an RAB from a sector may increase or decrease their data rates indiscriminately.

Returning to FIG. 1, the AT determines whether at least one RAB is set to 1 in step 116. If it is, the AT determines whether the current rate is 19.2 kbps or higher in step 126. If it is, the AT reduces the data rate by half. On the other hand, if the current rate is below 19.2 kbps, the AT maintains the data rate in step 128.

If all the RABs received from the sectors of the active set are 0s in step 116, the AT checks whether the current transmission is an initial access in step 118. In the case of the initial access, the AT applies the initial data rate in step 100. Otherwise, the AT checks whether the current data rate is a maximum one, 153.6 kbps in step 120. If it is the maximum data rate, the AT maintains the current data rate in step 122, and other wise, the AT doubles the current data rate in step 124 and transmits packet data at the doubled data rate in step 132. Here, if the AT is under power limitation, it maintains the current data rate.

As a result of transmission of the RAB with an FAB in time multiplexing on a forward MAC channel being a common channel, ATs receiving the RAB increase or decrease their data rates indiscriminately.

Despite bandwidth control and overhead control, the above conventional reverse data rate controlling method in the HDR system cannot ensure data transmission quality due to the indiscriminate control without considering AT and packet characteristics. Therefore, there is a need for an individual reverse data rate control for ATs and a bandwidth and overhead control based on the individual data rate control.

In the existing HDR system, if an AT receives RAB=1 on a forward MAC channel from at least one AN in the active set, it always reduces its data rate by half unless the reverse data rate is below 19.2 kbps. On the contrary, if all ANs in the active set transmit RAB=0, the AT doubles the data rate. In order to increase the twofold data rate by two times, the AT must receive forward MAC channels with RAB=0 from all ANs of the active set. Thus, the reverse data rate is monotonously increased. When the AT transmits packets requiring real time transmission or high quality transmission, an AN should allow the AT a data rate two or more times as high as the current data rate in a reverse margin band. In other words, the reverse data rate control must be performed on an individual AT basis.

SUMMARY OF THE INVENTION

An object of the present invention is, therefore, to provide an efficient reverse packet data transmission method in an HDR system.

Another object of the present invention is to provide an AT-based rate control method for increasing or decreasing a data rate according to the characteristic of an individual AT.

A third object of the present invention is to provide a method of performing a reverse data transmission control in consideration of the quality and characteristic of data currently being transmitted from an individual AT in order to effectively control the overload of an high data rate AN and thus ensure system performance and capacity.

A fourth object of the present invention is to provide a method of effectively controlling the overload of an high data rate AN for effective bandwidth control and dynamic bandwidth assignment on an individual AT basis.

A fifth object of the present invention is to provide a method of effectively controlling reverse packet data transmission by offering an access probability for each data rate in an high data rate system.

A sixth object of the present invention is to provide a method of increasing a reverse data rate based on an access probability assigned from an AN and controlling access according to the assigned access probability.

A seventh object of the present invention is to provide a method of increasing a reverse data rate by two or more times for an AT in an high data rate system.

An eighth object of the present invention is to provide a method of effectively controlling the overload of an AN by controlling the access probability of the AN, that is, to transmit data at a high data rate.

The foregoing and other objects of the present invention can be achieved by providing a reverse data rate controlling method in a mobile communication system for transmission of packet data.

According to one aspect of the present invention, an AT establishes a reverse link with initial values, receives an RRL message on a forward link, analyzes an ignore RAB field, and stores the value of the ignore RAB field. The AT determines a reverse data rate by comparing a current data rate with a data rate set in the RRL message and transmits packet data at the determined reverse data rate. Upon receipt of an RAB on the forward link, the AT changes the reverse data rate according to the value of the ignore RAB field.

An AN analyzes the type of the AT and the characteristics of a service in an initialization state and sets a MACindex for the AT on a forward MAC channel. If a predetermined reverse data rate must be maintained, the AN sets an ignore RAB field according to the AT type or the service characteristic, assembles an RRL message with the ignore RAB field, and transmits the RRL message to the AT.

According to another aspect of the present invention, an AT establishes a reverse link with initial values, receives an RRL message on a forward link, and stores access probabilities for data rates. The AT determines a reverse data rate by comparing a current data rate with a data rate set in the RRL message and transmits packet data at the determined reverse data rate. Upon receipt of an RAB on the forward link, the AT changes the reverse data rate according to the access probability.

An AN analyzes the type of the AT and the characteristics of a service in an initialization state and sets a MACindex for the AT on a forward MAC channel. The AN generates an access probability for each data rate according to the AT type or the service characteristic, assembles an RRL message with the access probabilities, and transmits the RRL message to the AT.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

There will be given a description of an AT operation for controlling a reverse data rate in a novel HDR system, a structure of a new RRL message for supporting the reverse data rate control, and an AN operation for supporting the reverse data rate control according to an embodiment of the present invention.

Figure 3:
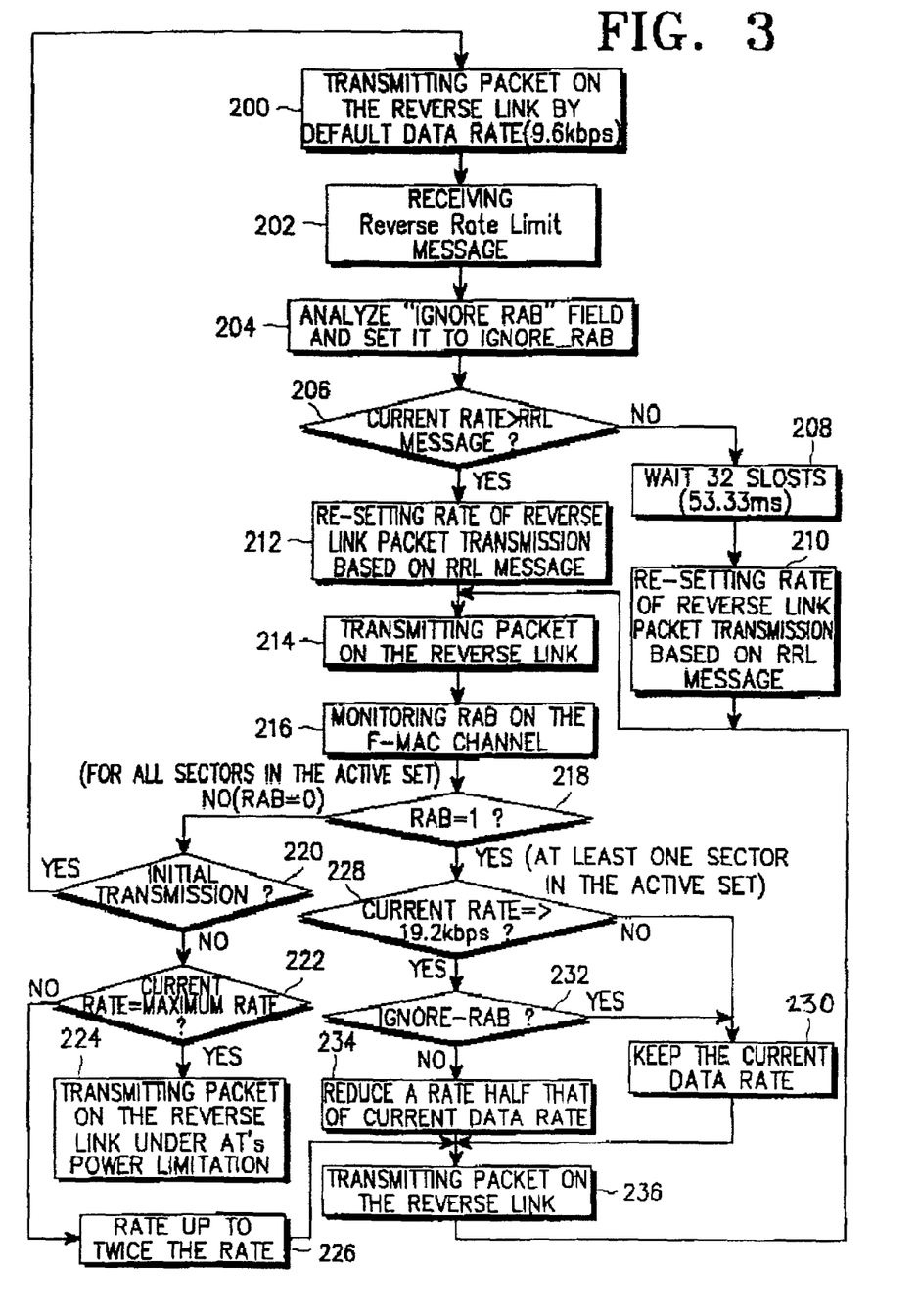
FIG. 3 is a flowchart illustrating a reverse data rate control operation at an AT in a high data rate system according to the first embodiment of the present invention.

FIG. 3 is a flowchart illustrating a reverse data rate control method at the AN in the high data rate system according to an embodiment of the present invention. To implement the reverse data rate control method, an existing RRL message should be modified as shown in Table 3.

TABLE 3

| Field | Length (bits) |
|---|---|
| Message ID | 8 |
| 29 occurrences of the following three fields | |
| Ignore RAB | 1 |
| RateLimitIncluded | 1 |
| RateLimit | 0 or 4 |
| Reserved | Variable |

The modified RRL message is broadcasted on a forward common channel or transmitted on a forward traffic channel, that is, a forward dedicated channel. The RRL message includes 29 records. An AT checks a data rate assigned to itself by a forward MACindex with which a corresponding record is identified and transmits reverse data based on the assigned data rate.

According to the embodiment of the present invention, the RRL message further includes a field "Ignore RAB" for reverse data rate control. As stated before, if a RAB from at least one sector in the active set is 1, an AT is supposed to reduce its reverse data rate by half. The field "Ignore RAB" is used to prevent the indiscriminate reduction of data rate. If Ignore RAB is set to 1, the current reverse data rate is maintained regardless of RABs from sectors in the active set. Ignore RAB is set for each AT in the RRL message.

Referring to FIG. 3, an AT maintains a data rate of 9.6 kbps at an initial access in step 200. Upon receipt of an RRL message in step 202, the AT analyses the Ignore RAB field in the RRL message and sets a variable "Ignore RAB" to the value of Ignore RAB in step 204.

In step 206, the AT compares a data rate set in the RRL message with the current data rate. If the current data rate is lower than the assigned data rate, which implies that the AT is supposed to increase its data rate, the AT waits 32 slots in step 208 and transmits data on the reverse link at the assigned data rate in step 210.

On the other hand, if the current data rate is higher than the assigned data rate, which implies that the AT is supposed to reduce its data rate, the AT reduces the data rate immediately in step 212, transmits the data on the reset data rate in step 214, and monitors RABs from sectors in the active set in step 216. The AT can maintain up to 6 sectors in its active set. ANs in the active set connected to the AT assign forward traffic channels, reverse traffic channels, and reverse power control channels. The AT monitors only control channels from ANs in the active set that are not connected to the AT. In step 218, the AT checks whether at least one RAB on a forward MAC channel is 1. If it is, the AT compares the current data rate with 19.2 kbps in step 228. If the current data rate is equal to or higher than 19.2 kbps, the AT goes to step 232, and otherwise, it goes to step 230. In step 230, the AT keeps the current data rate.

In step 232, the AT checks whether Ignore RAB is 1. If it is 1, the AT keeps the current data rate in step 230. If Ignore RAB is not 1, the AT reduces the current data rate by half in step 234.

In the above reverse data rate control procedure, the AT reduces the reverse data rate by half if it is equal to or higher than 19.2 kbps, except when Ignore RAB, reflecting the value of Ignore RAB, is 1. In this case, the current data rate is kept. On the other hand, if the current data rate is lower than 19.2 kbps, the AT keeps the current data rate. Hence, the conventional uniform data rate reduction can be prevented.

If RABs from all sectors in the active set are 0s, the AT is supposed to increase the data rate by twice, except that the rate of 9.6 kbps is kept, regardless of RABs, in the case of an initial access. Even if the AT is capable of increasing its data rate by twice, it should select a data rate in consideration of its maximum transmission power. If the AT cannot afford to increase the data rate in view of its power condition, it keeps the current data rate.

Figure 4:
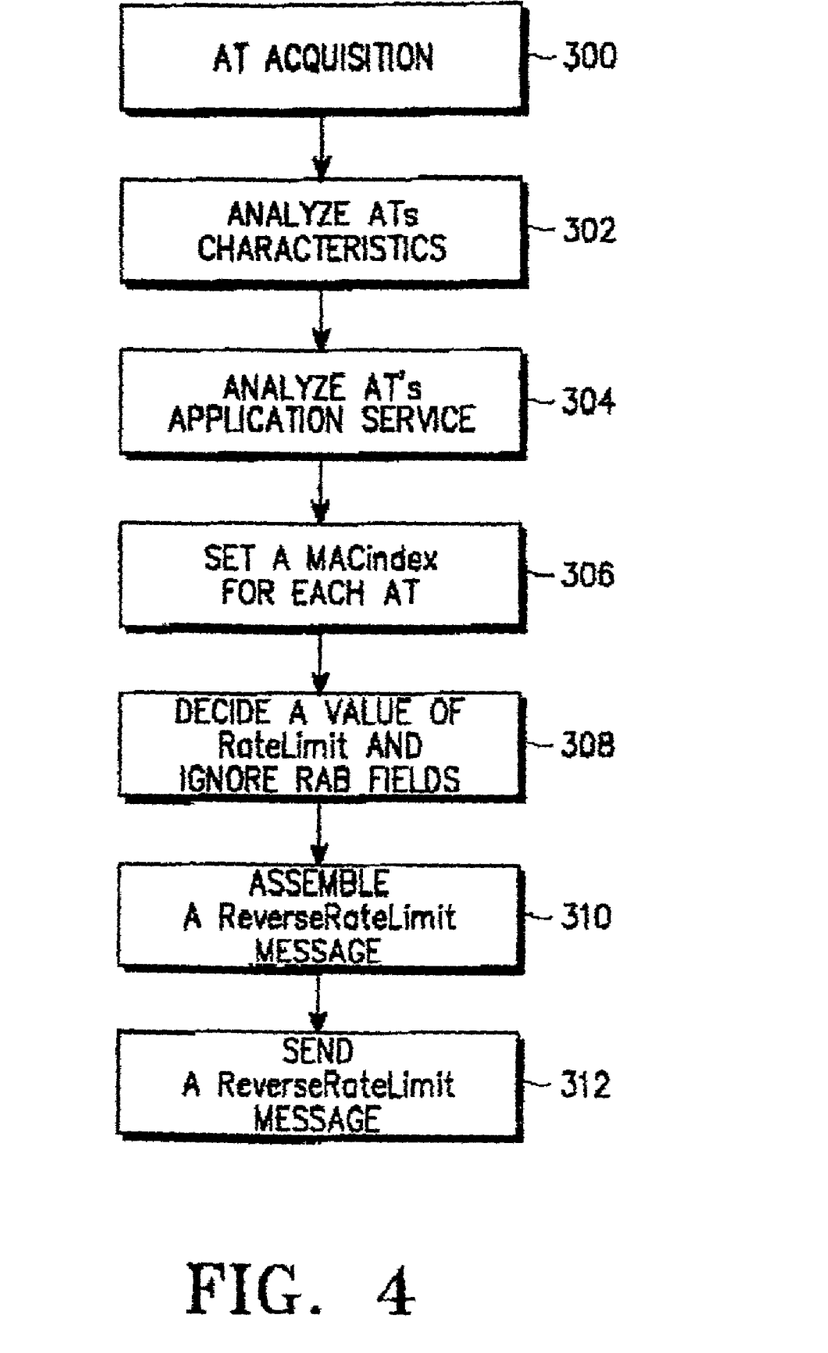
FIG. 4 is a flowchart illustrating a control operation for supporting the reverse data rate control at an AN in the high data rate system according to the first embodiment of the present invention.

FIG. 4 is a flowchart illustrating a control operation for supporting the reverse data rate control in an AN according to the embodiment of the present invention.

Referring to FIG. 4, when the AT transmits a connection request message, the AN acquires the AT in step 300 and analyzes the characteristics of the AT in step 302. In step 304, the AN analyzes the characteristics of traffic that the AT is to transmit. In other words, the AN determines as to what quality the packet data service requires. The AN transmits an RRL message in consideration of the characteristics of the AT and the application service.

In step 306, the AN sets a MACindex field for the AT in the RRL message. The AN can add up to 29 MACindexes as stated before.

The AN sets RateLimit and Ignore RAB to appropriate values in the RRL message in consideration of the characteristics of the AT and the application service in step 308. If a premium AT requires a high quality service, the AN sets Ignore RAB to 1 so that the AT can keep the current reverse data rate regardless of RABs on forward MAC channels from sectors in its active set. The AN assembles the RRL message using Message ID and other related message fields in step 310. In step 312, the AN broadcasts the RRL message on a forward control channel, or transmits it on a forward traffic channel at each ATs. By the use of the RRL message, the AN can control a reverse data rate individually. If all Ignore RAB fields are set to 0s, the RRL message provides an indiscriminate reverse data rate control as in the conventional technology. A reverse data rate control can be provided indiscriminately or selectively depending on the value of Ignore RAB. While Ignore RAB is added in the RRL message in the present invention, this field can be inserted into another message to prevent unnecessary decrease of a reverse data rate.

Figure 5:
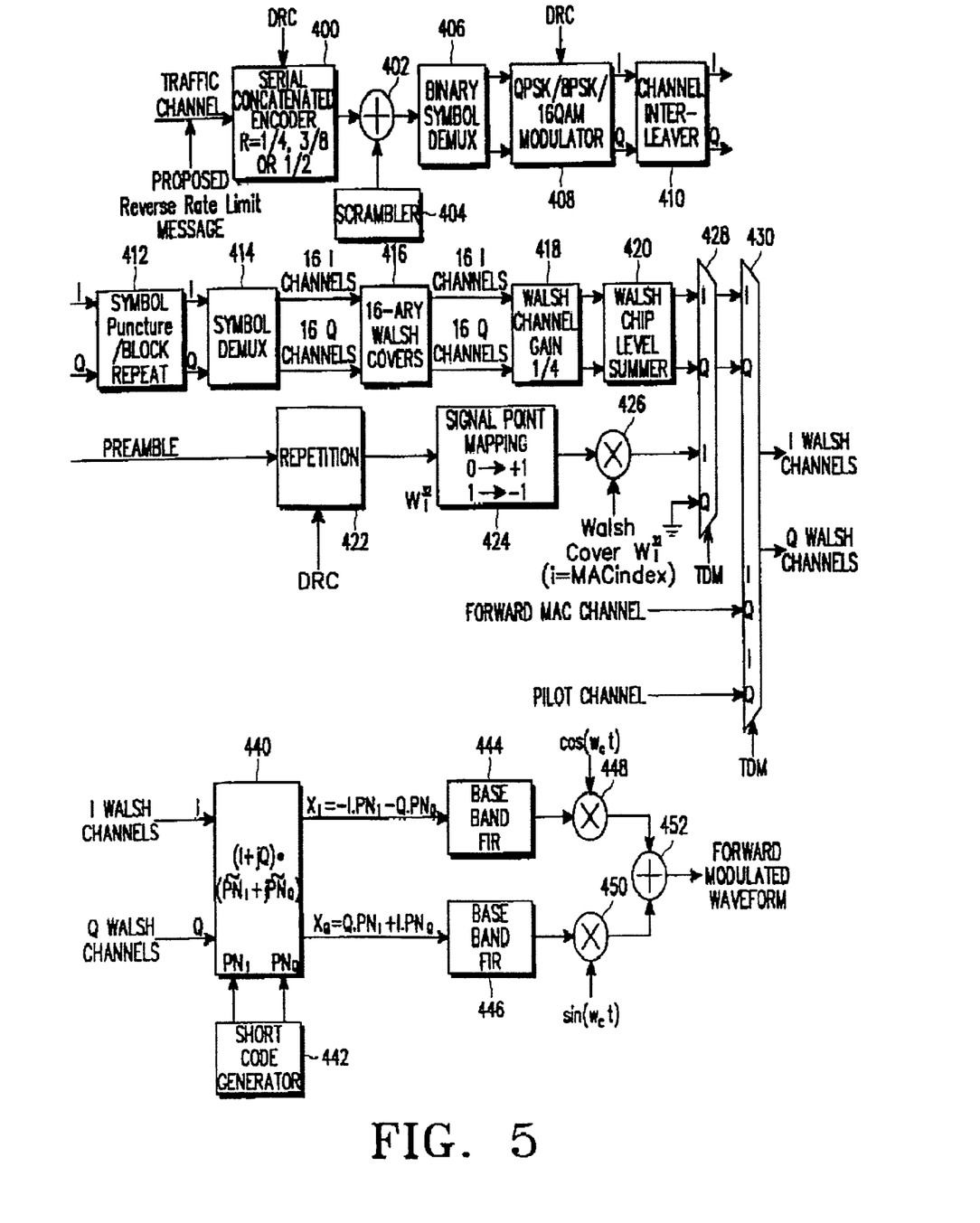
FIG. 5 is a block diagram of an AN device for supporting the reverse data rate control operation according to the embodiment of the present invention.

FIG. 5 is a block diagram of an AN device for supporting the reverse data rate control operation according to the embodiment of the present invention.

Referring to FIG. 5, the RRL message shown in FIG. 3 is transmitted on a traffic channel. Thus, an encoder 400 encodes a traffic signal with the RRL message and DRC (Data Rate Control) data. An adder 402 adds scrambled data received from a scrambler 404 to the encoded data received from the encoder 400. A demultiplexer (DEMUX) 406 demultiplexes the output of the adder 402. A modulator 408 modulates the demultiplexed signal and outputs an I channel signal and a Q channel signal separately. A channel interleaver 410 interleaves the I and Q modulation signals.

A repeater 412 subjects the interleaved I and Q channel signals to symbol puncturing and block repetition. A symbol DEMUX 414 constructs 16 I channels and 16 Q channels by demultiplexing the output of the repeater 412. A Walsh cover 416 Walsh-covers each I/Q channel and a Walsh channel gain controller 418 adds a Walsh channel gain to the output of the Walsh cover 416. A Walsh chip level summer 420 sums the outputs of the Walsh channel gain controller 418 at a chip level. Meanwhile, a preamble indicating the start of a frame is repeated in a repeater 422, mapped in a mapper 424 for signaling matching, and multiplied by Walsh cover data in a multiplier 426. A first time division multiplexer (MUX) 428 time-division-multiplexes the outputs of the chip level summer 420 and the multiplier 426. A second time division MUX 430 time-division-multiplexes the output of the first time division MUX 428, forward MAC channel data, and pilot channel data and outputs the multiplexed signal as an I channel signal and a Q channel signal separately.

A PN combiner 440 adds the I and Q channel signals respectively to a short code generated from a short code generator 442. Baseband filters 444 and 446 filter the outputs of the PN combiner 440 and carrier combiners 448 and 450 convert the filtered signals to transmission signals. An adder 452 adds the outputs of the carrier combiners 448 and 450 prior to transmission.

As described above, the introduction of Ignore RAB into the RRL message prevents indiscriminate change of reverse data rates in ATs, to thereby enable reverse data transmission according to the characteristics of the ATs.

Now there will be given a description of an AT operation for controlling a reverse data rate in a novel high data rate system, a structure of a new RRL message for supporting the reverse data rate control, and an AN operation for supporting the reverse data rate control according to another embodiment of the present invention.

Figure 6:
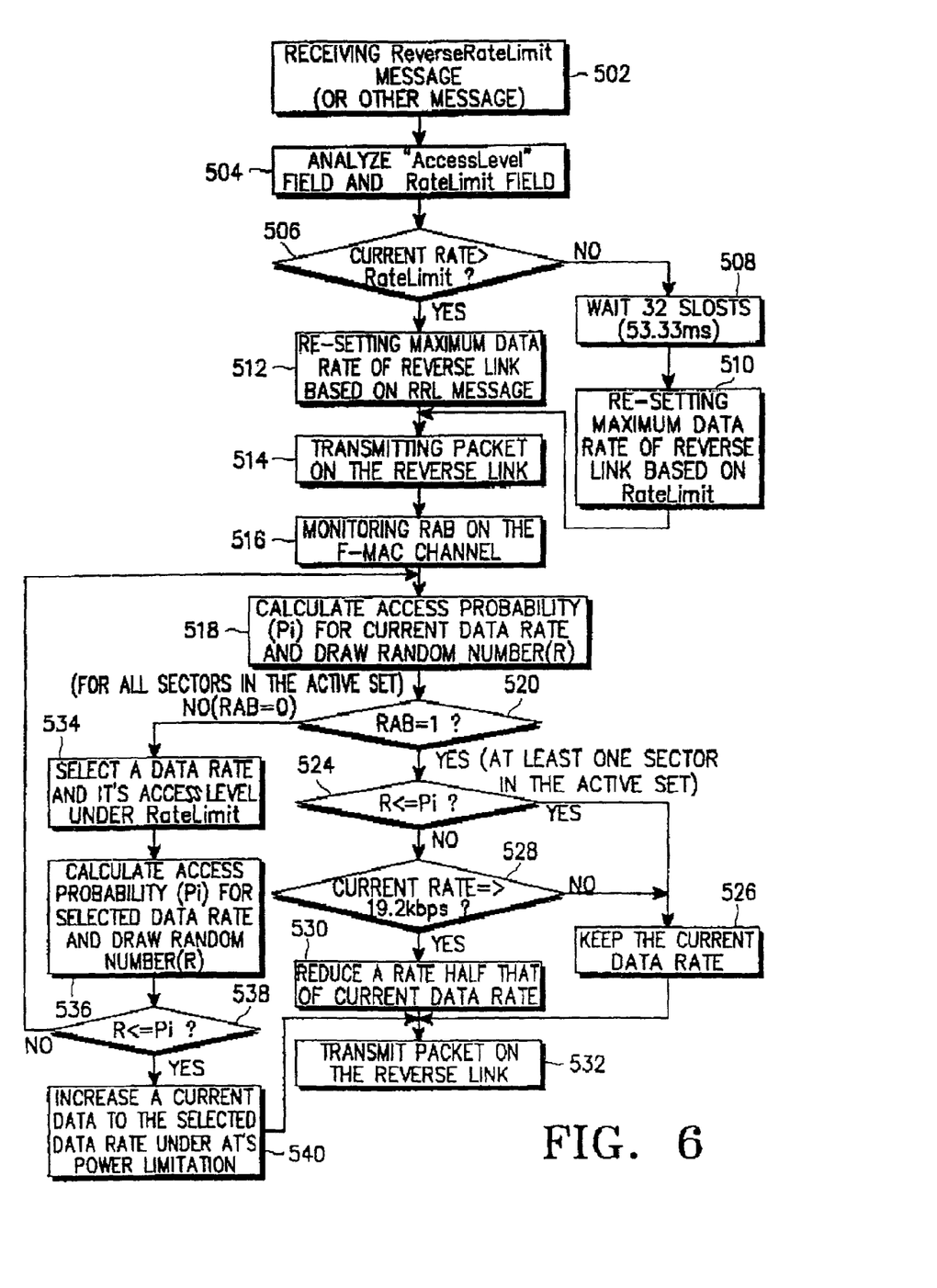
FIG. 6 is a flowchart illustrating a reverse data rate control operation at an AT in the high data rate system according to the second embodiment of the present invention.

FIG. 6 is a flowchart illustrating a reverse data rate control method in an high data rate system according to another embodiment of the present invention. To implement the reverse data rate control method, information fields shown in Table 4 should be added to a forward message or constructed into a new message. While Table 4 illustrates an RRL message according to the second embodiment of the present invention, the information fields can be added to a message such as a channel assignment message. In this case, the same operation as applied with the RRL message is performed with the channel assignment message.

TABLE 4

| Field | Length (bits) |
|---|---|
| Message ID | 8 |
| 29 occurrences of the following three fields | |
| RateLimitIncluded | 1 |
| RateLimit | 0 or 4 |
| AccessLevel4.8kbps | 0 or 3 |
| AccessLevel9.6kbps | 0 or 3 |
| AccessLevel19.2kbps | 0 or 3 |
| AccessLevel38.4kbps | 0 or 3 |
| AccessLevel76.8kbps | 0 or 3 |
| AccessLevel153.6kbps | 0 or 3 |
| Reserved | Variable |

This RRL message is broadcasted on a forward common channel or transmitted on a forward traffic channel at each ATs, that is, a forward dedicated channel. The RRL message includes 29 records. An AT checks a data rate assigned to itself by a forward MACindex with which a corresponding record is identified and transmits reverse data based on the assigned data rate.

According to the second embodiment of the present invention, the RRL message further includes access level fields by which access probabilities for reverse data rates can be calculated. As stated before, if a RAB from at least one sector in the active set is 1, an AT is supposed to reduce its reverse data rate by half. On the other hand, if RABs from all sectors in the active set are 0s, the AT is supposed to increase the reverse data rate by twice within the rate limit set in the RRL message.

To increase the data rate by more times than two fold, an access probability is calculated using an access level for a corresponding data rate referring to Table 4. If RateLimit is added, ReverseRateIncluded is always set to 1. If RateLimit is omitted, ReverseRateIncluded is always set to 0 and then the access level fields are not added. If RateLimit represents 4.8 kbps, only AccessLevel4.8 kbps is added. If RateLimit represents 19.2 kbps, AccessLevel4.8 kbps and AccessLevel19.2 kbps are added. 3 bits are assigned to an access level field. An access level is expressed as an integer as follows.

| | |
|---|---|
| 0 × 0 | 1 |
| 0 × 1 | 2 |
| 0 × 2 | 3 |
| 0 × 3 | 4 |
| 0 × 4 | 5 |
| 0 × 5 | 6 |
| 0 × 6 | 7 |
| 0 × 7 | 8 |

While the RRL message shown in Table 4 assigns an access level to each AT, it can be modified to offer the access levels as a common variable that all ATs can refer to in Table 5. In this case, access level fields of a fixed length follow RateLimit for the 29th MACindex as shown in Table 5, while the number of access level fields is changed according to RateLimit in the RRL message of Table 4.

TABLE 5

| Field | Length (bits) |
| --- | --- |
| Message ID | 8 |
| 29 occurrences of the following three fields | |
| RateLimitIncluded | 1 |
| RateLimit | 0 or 4 |
| AccessLevel4.8kbps | 3 |
| AccessLevel9.6kbps | 3 |
| AccessLevel19.2kbps | 3 |
| AccessLevel38.4kbps | 3 |
| AccessLevel76.8kbps | 3 |
| AccessLevel153.6kbps | 3 |
| Reserved | Variable |

The access level fields are always added to the RRL message. After checking its MACindex, an AT transmits reverse data using an access level corresponding to Rate-Limit for itself.

The procedure shown in FIG. 6 is applicable to both the RRL messages of Table 4 and Table 5 because they are different simply in structure.

Referring to FIG. 6, upon receipt of an RRL message including information fields shown in Table 4 or Table 5 in step 502, an AT analyzes the RRL message and stores AccessLevel and RateLimit as variables in step 504.

In step 506, the AT compares an available maximum data rate set in the RRL message with the current reverse data rate. If the current data rate is lower than the maximum data rate, which implies that the AT is supposed to increase its data rate, the AT waits 32 slots in step 508, resets the current data rate in step 510, and continues data transmission at the reset data rate in step 514.

On the other hand, if the current data rate is higher than the maximum data rate, which implies that the AT is supposed to reduce its data rate, the AT reduces the current data rate immediately in step 512 and transmits packet data on the reverse link in step 514. During the packet transmission, the AT monitors forward MAC channels, especially RABs on the forward MAC channels in step 516. As stated before, the AT can maintain up to six sectors in its active set. ANs in the active set connected to the AT assign forward traffic channels, reverse traffic channels, and reverse power control channels. The AT monitors only control channels from ANs in the active set that are not connected to the AT. While monitoring RABs in step 516, the AT calculates an access probability Pi using an access level for the current data rate stored in a memory and then calculates a random number R by a randomization formula in step 518. Here $0 \leq R < 1$ $0 < Pi < 1$ and the access probability Pi is calculated by $$Pi = \frac{1}{2^{(N-1)}} \quad (1)$$

where N is the value of AccessLevel in the RRL message. A different N value is set for a different data rate. N ranges from 1 to 8 but the range can be adjusted according to available reverse data rates.

The AT checks whether at least one RAB is set to 1 in step 520. If it is, the AT performs a persistence test, that is, the AT compares Pi with R in step 524. If Pi is equal to or greater than R, the AT keeps the current data rate in step 526. For example, if an AN transmits N=1 to the AT in consideration of the current reverse data rate, Pi is 1, always greater than R by Eq. (1). Therefore, the AT is allowed to keep the current data rate. On the other hand, if R is greater than Pi in step 524, the AT compares the current data rate with 19.2 kbps in step 528. If the current data rate is equal to or higher than 19.2 kbps, the AT reduces the current data rate by half in step 530 and transmits reverse data at a reduced data rate in step 532. If the current data rate is lower than 19.2 kbps, the AT keeps the current data rate in step 526.

If RABs from all ANs in the active set are 0s in step 520, the procedure goes to step 534. In the case of RAB=0, the conventional high data rate system increases the current data rates of ATs by twice, indiscriminately in consideration of the transmission power and the available maximum data rates of the ATs. However, the AT can select a data rate twice or higher than current data rate within an available maximum data rate in the present invention.

Therefore, the AT selects a data rate in consideration of the available maximum data rate and its transmission power in step 534. Here, a data rate is two or more times as high as the current data rate. The AT calculates an access probability Pi and a random number R using an access level for the selected data rate in step 536 and compares Pi with R in a persistence test in step 538. If Pi is greater than or equal to R, the AT increases the current data rate to the selected data rate under power limitation in step 540 and transmits reverse data at the selected data rate in step 532.

On the other hand, if R is greater than Pi in step 238, the AT calculates a new access probability Pi and a new random number R using an access level related with the current data rate in step 518.

As the AN adjusts N to be a value corresponding to a low access probability for a higher data rate, system overload is controlled and access congestion can be alleviated. Whether the AT will select a data rate two or more times as high as the current data rate falls into a system configuration issue. Yet, the increase of the current data rate by more times than two will prolong the period when RAB=0 from the sectors of the active set and increase an access probability. In this context, the system can be designed.

Transmission of appropriate N (N=1) in consideration of the current data rates of ATs, prevents indiscriminate data rate reduction. That is, transmission of different N to ATs ensures selective data rate reduction. When RABs from all the sectors of the active set are 0s, the current data rate can be increased by more times than two. Since an access probability varies with N, setting N to an appropriate value ensures the whole system overload control and a data rate two or more times higher than the current data rate. It is to be noted here that a data rate must be selected in consideration of a maximum data rate set in RateLimit and the maximum transmission power of the AT. If the AT is not capable of increasing the data rate in view of its power limitation, it keeps the current data rate.

Figure 7:
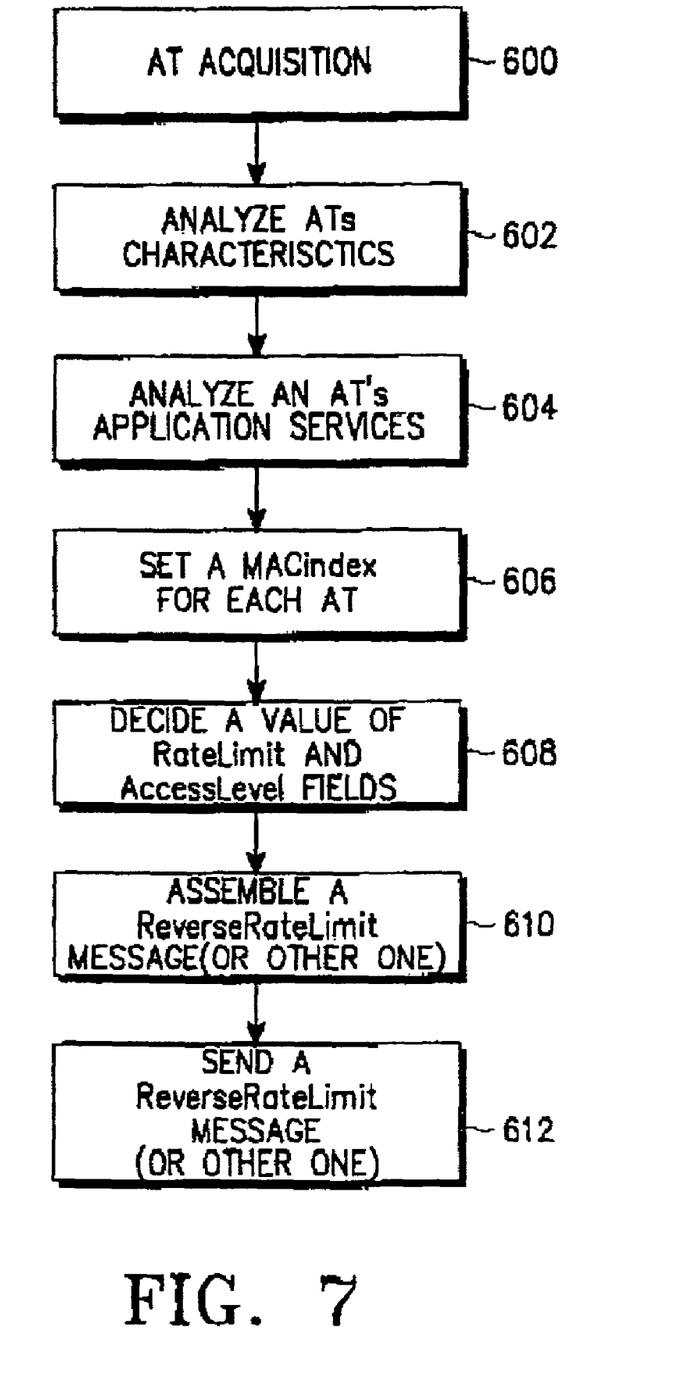
FIG. 7 is a flowchart illustrating a control operation for supporting the reverse data rate control at an AN in the high data rate system according to the second embodiment of the present invention.

FIG. 7 is a flowchart illustrating an operation for supporting the reverse data rate control in an AN according to the second embodiment of the present invention.

Referring to FIG. 7, upon receipt of a connection request message from an AT, the AN acquires the AT in step 600 and analyzes the characteristics of the AT in step 602. In step 604, the AN analyzes the characteristics of traffic that the AT is to transmit, that is, determines what quality the packet data service requires. Taking the characteristics of the AT and the application service into consideration, the AN generates an RRL message or a message including related parameters. In step 606, the AN sets a MACindex designating the AT to transmit the RRL message. Up to 29 MACindexes can be included in the RRL message as stated before. The AN sets RateLimit and AccessLevel to appropriate values in step 608. AccessLevel can be set as shown in Table 4 or Table 5. AccessLevel can be set in the following way to obtain a different access probability for a different data rate. While a different method can be used to set AccessLevel, simply different values are set in the access level fields and the same reverse data rate control operation is applied. The success condition is given as $R \leq P_i$ in the present invention. It is supposed that N ranges from 1 to 8 since the current high data rate system supports 4.8/9.6/19.2/38.4/76.8/153.6 kbps and at least three bits are needed to assign one AccessLevel for one data rate. As stated before, the range of N can be changed according to available reverse data rates. According to the present invention, for $N=1$, $P_i=1$ by Eq. (1). Because $0 \leq R < 1$, if $N=1$, the persistence test results in a success. Therefore, if the AN sets AccessLevel for a specific data rate to 1, it implies that the AN allows the specific data rate to be available. On the contrary, if N is 8, $P_i$ is 0.0078125 and a success probability is very low in the persistence test. Thus, the AN can set N to an appropriate value in consideration of the system capacity, the reverse link load, and the current data rate of the AT.

After setting RateLimit and AccessLevel, the AN assembles the RRL message using Message ID and other related message fields in step 610. The AN broadcasts the RRL message on a forward control channel or on a traffic channel in step 612. The use of the RRL message enables selective control of reverse data rates and an increase of more times than two in a reverse data rate.

While AccessLevel fields are added in the RRL message to control the data rate of an AT in the present invention, it can be further contemplated that the AccessLevel fields are inserted into another message. That is, to prevent an unnecessary decrease in reverse data rate and obtain a reverse data rate more times than twice as high as the current data rate, the scheme of the present invention is applicable to a message other than the RRL message.

The RRL message is constructed in the structure of Table 4 or Table 5 according to the procedure of FIG. 7 and transmitted in the device shown in FIG. 5.

Figure 8:
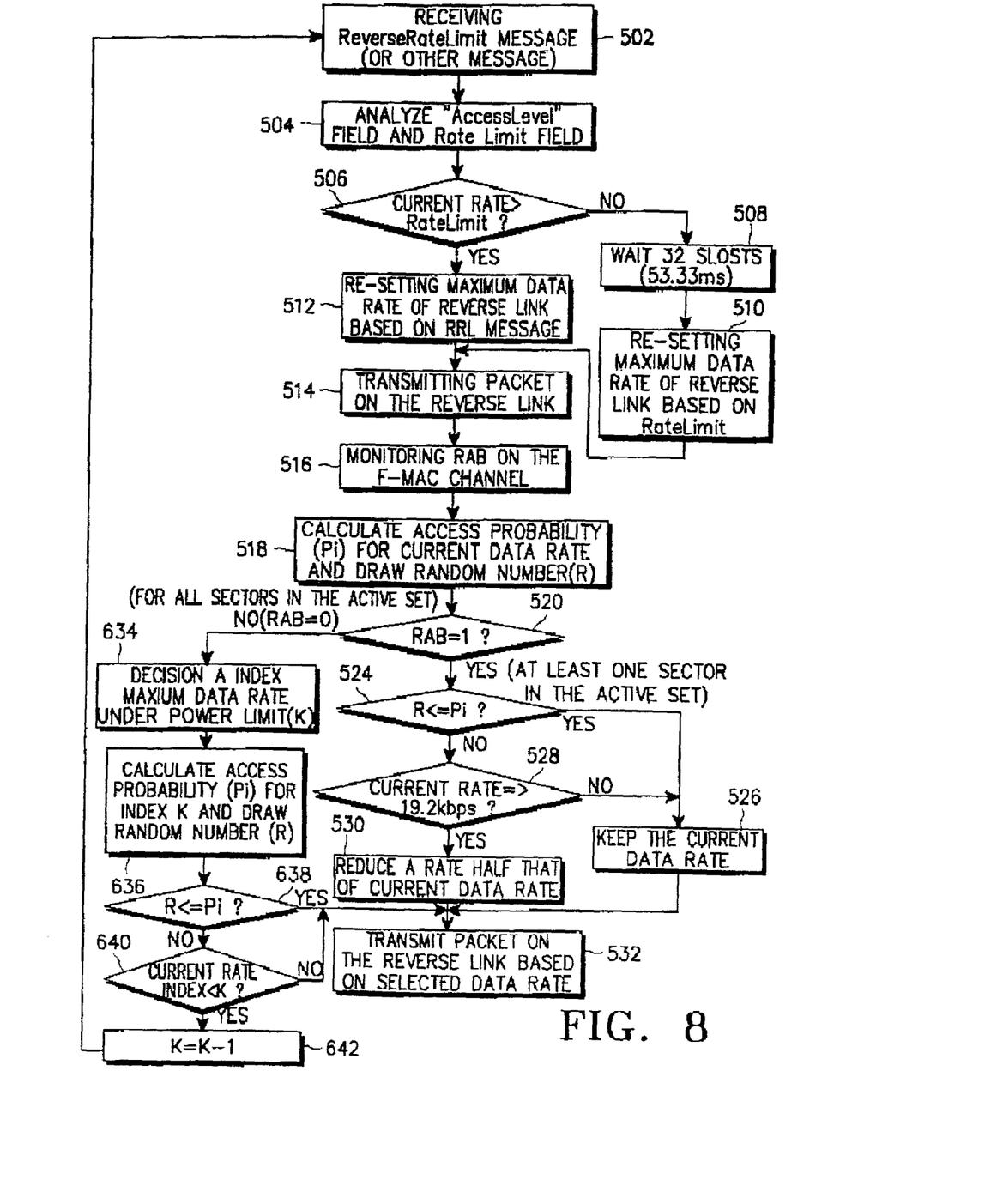
FIG. 8 is a flowchart illustrating a reverse data rate control operation in the high data rate system according to a third embodiment of the present invention.

FIG. 8 is a flowchart illustrating a reverse data rate control operation in a high data rate system according to a third embodiment of the present invention. The procedure shown in FIG. 8 is similar to that of FIG. 6 except for steps 534 to 542 of FIG. 6. If RABs from all ANs in the active set are 0s in step 520, the AT selects as the highest data rate as possible within a maximum data rate assigned in RateLimit considering the current available transmission power. Indexes for data rates are given in Table 6.

TABLE 6

| Data Rate (kbps) | Index |
|---|---|
| 4.8 | 1 |
| 9.5 | 2 |
| 19.2 | 3 |
| 38.4 | 4 |
| 76.8 | 5 |
| 153.6 | 6 |

In step 634, the AT determines an index K for the selected data rate under its power limit. The AT calculates an access probability $P_i$ and a random number R using an access level corresponding to a data rate for K in step 636. The AT compares $P_i$ with R in step 638 and if $P_i$ is equal to or greater than R, the AT transmits reverse data at the data rate corresponding to K in step 532. If $P_i$ is less than R, the AT compares an index corresponding to the current data rate with the selected K in step 640. If K is equal to or less than the index of the current data rate, the AT keeps the current data rate and transmits the reverse data in step 532. On the other hand, if K is greater than the index for the current data rate, the AT decreases K by 1 in step 642 and returns to step 502. Since the present high data rate system allows the reverse data rate to increase by at least two times, if an access level for a data rate one step higher than the current data rate is set to 1, the twofold increase of the reverse data rate is always ensured.

While a data rate is selected according to an access level in a descending order in FIG. 8, it can be done in an ascending order. Also in this case, the AT must select a data rate under its power limit. Or a data rate can be selected randomly as far as selection of the same data rate repeatedly is avoided, and the AT considers its transmission power in selection of a data rate.

In accordance with the present invention, with a reverse data rate control at an AT level by calculating an access probability according to an access level, the overload of an high data rate AN is efficiently controlled and system performance and capacity are ensured as compared to an indiscriminate reverse data rate control at a system level. In addition, the reverse data rate control is performed in consideration of traffic characteristics and AT characteristics, thereby providing efficient bandwidth control and dynamic bandwidth assignment on an AT basis.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A reverse data rate controlling method in a data communication system between an access network (AN) and access terminals (ATs), comprising the steps of:
   transmitting data at initial reverse data rates to the AN;
   receiving a message including ignore RAB (Reverse Activity Bit) information indicating whether the ATs should not change the reverse data rates from the AN in at least one AT;
   receiving a RAB indicating increase or decrease of the reverse data rates from the AN; and
   ignoring the RAB in the at least one AT received the ignore RAB information.

2. The reverse data rate controlling method of claim 1, wherein the ignore RAB information is included in an RRL (Reverse Rate Limit) message.

3. A reverse data rate controlling method in an access terminal (AT) in a mobile communication system, comprising the steps of:
   establishing a reverse link with initial values, receiving an RRL (Reverse Rate Limit) message on a forward link and storing a value of an ignore reverse activity bit (RAB) field included in the reverse rate limit (RRL) message;
   determining a reverse data rate by comparing a current data rate with a data rate set in the RRL message and transmitting packet data at the determined reverse data rate; and changing the reverse data rate according to the value of the ignore RAB field upon receipt of an RAB on the forward link.

4. The reverse data rate controlling method of claim 3, wherein if the reverse data rate decrease is requested and the ignore RAB field indicates neglect of the RAB, the reverse data rate decrease is not performed.

5. The reverse data rate controlling method of claim 4, wherein if the reverse data rate decrease is requested and the ignore RAB does not indicate neglect of the RAB, the reverse data rate is decreased unless the reverse data rate is the lowest data rate.

6. A reverse data rate controlling method in an access network (AN) in a mobile communication system, comprising the steps of:
  analyzing characteristics of an access terminal (AT) or a service in an initialization state for the AT and setting a medium access control (MAC) index for the AT on a forward MAC channel;
  setting an ignore reverse activity bit (RAB) field if a predetermined data rate must be maintained according to the characteristics of an AT or a service ; and
  assembling an reverse rate limit (RRL) message with the ignore RAB field and transmitting the RRL message to the AT.

7. The reverse data rate controlling method of claim 6, wherein if the AT is one of a premium AT and an emergency AT, the ignore RAB field is set.

8. The reverse data rate controlling method of claim 6, wherein if the service is one of a high quality data service and a real time data service, the ignore RAB field is set.

9. A reverse data rate controlling method in a plurality of access terminals (ATs) in a data communication system between an access network (AN) and the ATs, comprising the steps of:
  receiving an reverse activity bit (RAB) indicating increase or decrease of reverse data rates from the AN during transmitting data at the reverse data rates to the AN;
  comparing access probabilities corresponding to the reverse data rates with random numbers generated in the ATs; and
  increasing the reverse data rates for the respective ATs and determining the data rate according to the comparison result and transmitting data at the determined increased data rates.

10. The reverse data rate controlling method of claim 9, wherein the ATs receive different access probabilities for different reverse data rates by an reverse rate limit (RRL) message on a forward link.

11. The method of claim 9, wherein the ATs establish the access probabilities, which are different access probabilities for different reverse data rates, as initial values.

12. The method of claim 9, wherein said data rate determination is selected under power limitation of the AT.

13. A reverse data rate controlling method in an access terminal (AT) in a mobile communication system, comprising the steps of:
  establishing a reverse link with initial values, receiving an reverse rate limit (RRL) message on a forward link, and storing access probabilities for data rates;
  determining a reverse data rate by comparing a current data rate with a data rate set in the RRL message and transmitting packet data at the determined reverse data rate; and
  changing the reverse data rate according to the access probabilities based on the received data rate upon receipt of a reverse activity bit (RAB) on the forward link.

14. The reverse data rate controlling method of claim 13, wherein if the reverse data rate decrease is requested, a random number is generated, the random number is compared with the access probability for the current data rate, and the current data rate decrease if the comparison result satisfies a decrease condition.

15. The reverse data rate controlling method of claim 14, wherein if the reverse data rate decrease is requested, a random number is generated, the random number is compared with the access probability for the current data rate, and the current data rate is kept if the comparison result does not satisfies a decrease condition.

16. The reverse data rate controlling method of claim 13, wherein if the reverse data rate increase is requested, a data rate higher than the current data rate, but below the data rate set in the RRL message, is selected, a probability value of the selected data rate is compared with the random number, and if the comparison result satisfies an increase condition, the current data rate is increased to the selected data rate.

17. The reverse data rate controlling method of claim 16, wherein if the current data rate is the data rate set in the RRL message, the random number is not compared with the access probability.

18. The reverse data rate controlling method of claim 13, wherein if the reverse data rate increase is requested, data rates higher than the current data rate are selected sequentially in a descending order beginning from the data rate set in the RRL message, a random number is generated for each selected data rate, the access probability of the selected data rate is compared with the random number, and if the comparison result satisfies an increase condition, the current data rate is increased to the selected data rate.

19. A reverse data rate controlling method in a mobile communication system for transmission of packet data, comprising the steps of:
  analyzing characteristics of an access terminal (AT) or a service in an initialization state for the AT and setting a medium access control (MAC) index for the AT on a forward MAC channel;
  generating an access probability for each data rate according to an AT type or the service characteristic; and
  assembling an reverse rate limit (RRL) message with the access probabilities and transmitting the RRL message to the AT.

20. The reverse data rate controlling method of claim 19, wherein if the AT is one of a premium AT and an emergency AT, a higher access probability is set for a higher data rate.

21. The reverse data rate controlling method of claim 19, wherein if the service is one of a high quality data service and a real time data service, a higher access probability is set for a higher data rate.

22. The method of claim 19, wherein the access probability for each data rate is broadcasted on a common channel.

23. The method of claim 19, wherein the access probability for each data rate is transmitted to each AT on a traffic channel.

24. In an access terminal (AT) apparatus for transmitting reverse packet data in a mobile communication system, a control procedure performed when transmitting the reverse packet data in the AT apparatus comprising the steps of:
  establishing a reverse link with initial values, receiving an RRL (Reverse Rate Limit) message on a forward link, analyzing an ignore reverse activity bit (RAB) field, and storing the value of the ignore RAB field;

determining a reverse data rate by comparing a current data rate with a data rate set in the RRL message and transmitting packet data at the determined reverse data rate; and changing the reverse data rate according to the value of the ignore RAB field upon receipt of an RAB on the forward link.

25. In an access network (AN) apparatus for transmitting reverse packet data in a mobile communication system, a control procedure performed when transmitting the reverse packet data in the AN apparatus comprising the steps of:

analyzing characteristics of an access terminal (AT) or a service in an initialization state for the AT and setting a medium access control (MAC) index for the AT on a forward MAC channel;

setting an ignore reverse activity bit (RAB) field if a predetermined data rate must be maintained according to the AT or the service characteristic; and assembling an reverse rate limit (RRL) message with the ignore RAB field and transmitting the RRL message to the AT.

26. In an access terminal (AT) apparatus for transmitting reverse packet data in a mobile communication system, a control procedure performed when transmitting the reverse packet data in the AT apparatus comprising the steps of:

establishing a reverse link with initial values, receiving an reverse rate limit (RRL) message on a forward link, and storing access probabilities for data rates;

determining a reverse data rate by comparing a current data rate with a data rate set in the RRL message and transmitting packet data at the determined reverse data rate; and changing the reverse data rate according to the access probabilities upon receipt of a reverse activity bit (RAB) on the forward link.

27. In an access network (AN) apparatus for transmitting reverse packet data in a mobile communication system, a control procedure performed when transmitting the reverse packet data in the AN apparatus comprising the steps of:

analyzing a type of an access terminal (AT) and characteristics of a service in an initialization state for the AT and setting a medium access control (MAC) index for the AT on a forward MAC channel;

generating an access probability for each data rate according to the characteristics of an AT or a service; and assembling an reverse rate limit (RRL) message with the access probabilities and transmitting the RRL message to the AT.

* * * * *